(12) United States Patent
Cho

(10) Patent No.: US 7,790,311 B2
(45) Date of Patent: *Sep. 7, 2010

(54) RECHARGEABLE BATTERY HAVING LEAD TERMINAL EXTENDING ALONG AT LEAST HALF OF A CIRCUMFERENCE OF AN ELECTRODE ASSEMBLY

(75) Inventor: Kyu-Woong Cho, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 946 days.

This patent is subject to a terminal disclaimer.

(21) Appl. No.: 11/158,100

(22) Filed: Jun. 22, 2005

(65) Prior Publication Data

US 2005/0287431 A1 Dec. 29, 2005

(30) Foreign Application Priority Data

Jun. 23, 2004 (KR) ...................... 10-2004-0047014

(51) Int. Cl.
*H01M 2/28* (2006.01)
(52) U.S. Cl. .................. 429/161; 429/211; 429/94; 429/178; 429/163
(58) Field of Classification Search ................ 429/233, 429/234, 237, 211, 209, 178, 163, 164, 161, 429/94
See application file for complete search history.

(56) References Cited

U.S. PATENT DOCUMENTS

| 1,916,709 | A | * | 7/1933 | Zimmerman | ................. | 429/149 |
| 2004/0247998 | A1 | * | 12/2004 | Nakanishi et al. | ........... | 429/161 |
| 2005/0287429 | A1 | * | 12/2005 | Cho et al. | ................... | 429/161 |

FOREIGN PATENT DOCUMENTS

| JP | 2000150306 | 5/2000 |
| JP | 2003-7346 | 1/2003 |
| JP | 2004-111300 | 4/2004 |

* cited by examiner

*Primary Examiner*—Raymond Alejandro
(74) *Attorney, Agent, or Firm*—H.C. Park & Associates, PLC

(57) ABSTRACT

A rechargeable battery comprises an electrode assembly including a positive electrode, a negative electrode, and a separator that is interposed between the positive electrode and negative electrode. The battery further comprises a case for housing the electrode assembly, a cap assembly for sealing the case, a positive terminal and a negative terminal placed in the cap assembly and coupled with the electrode assembly, and lead elements that are coupled with the electrode assembly and the positive terminal and negative terminal. The positive and negative electrodes include uncoated regions that are not coated with positive active materials or negative active materials, respectively, and the lead elements are placed along the periphery of the uncoated regions to be coupled with at least half of the uncoated regions.

9 Claims, 9 Drawing Sheets ation No. 10-2004-0047014, filed in the
RECHARGEABLE BATTERY HAVING LEAD TERMINAL EXTENDING ALONG AT LEAST HALF OF A CIRCUMFERENCE OF AN ELECTRODE ASSEMBLY

CROSS REFERENCE TO RELATED APPLICATION

This application claims priority to and the benefit of Korean patent application No. 10-2004-0047014, filed in the Korean Intellectual Property Office on Jun. 23, 2004, the entire disclosure of which is incorporated herein by reference.

BACKGROUND OF THE INVENTION

1. Field of the Invention

The present invention relates to a rechargeable battery. More particularly, it relates to a structure connecting an electrode assembly with lead elements.

2. Discussion of the Background

A rechargeable battery may be charged and discharged unlike a nonrechargeable battery that may not be recharged. A low capacity rechargeable battery that comprises a pack shaped battery cell may be used as a power source for various small portable electronic devices such as cellular phones, laptop computers, and camcorders. A high capacity rechargeable battery that has several tens of the battery cells that are connected may be used as power sources for driving motors such as hybrid automobile.

The rechargeable battery may be fabricated into various shapes including a cylindrical and a rectangular box shape and may comprise an electrode assembly comprising a positive electrode and a negative electrode and an insulating separator that is interposed in between the electrodes and is wound and inserted into a case. The case is mounted with a cap assembly that is formed with an outer terminal to provide a battery.

The positive electrode and the negative electrode are provided with a conductive lead element to collect current that is generated during a cell's operation. The lead elements transfer the current that is generated in the positive electrode and the negative electrode to a positive terminal and a negative terminal, respectively.

When the electrode assembly is integrated with the lead elements that connect the electrode assembly with the external terminals, it becomes difficult to output a voltage that is generated in each part of the electrode assembly. This causes a potential difference between the area where the electrode assembly is welded to the lead element and the area surrounding the welding area. This potential difference degrades the welding area and the degradation increases as the battery is charged repeatedly. Consequently, the output of the battery drops and the lifespan of the battery shortens. These problems are exacerbated in a battery for driving a motor which repeats charge and discharge within a short amount of time.

For this reason, multi-tabs are used as the lead elements in a high-power rechargeable battery. For example, a rechargeable battery that uses multi-tabs as lead elements is disclosed in Japanese Patent Laid-Open No. 2003-007346. Conventional rechargeable batteries that include this technology, however, weld the multi-tabs into the current collectors of the positive electrode and negative electrode or they form the multi-tabs as part of the current collectors. The use of multi-tabs decreases the manufacturing efficiency because it requires numerous workers to manufacture the secondary battery.

Also, since the multi-tab-type lead elements are partially connected to the positive electrode and negative electrode and they collect the current that is generated at the positive electrode and negative electrode, it becomes difficult to collect a sufficient amount of current, especially in a motor-driven battery that requires a high output of power. Thus, the multi-tab-type lead elements are highly likely to degrade the properties of the battery.

SUMMARY OF THE INVENTION

The present invention provides a rechargeable battery that has an increased current collecting efficiency by improving a lead element and a structure that couples the lead element with an electrode assembly.

The present invention also provides a rechargeable battery with an improved manufacturing process.

Additional features of the invention will be set forth in the description which follows, and in part will be apparent from the description, or may be learned by practice of the invention.

The present invention discloses a rechargeable battery comprising an electrode assembly including a positive electrode, a negative electrode, and a separator that is interposed between the positive and negative electrodes. The rechargeable battery further comprises a case for housing the electrode assembly, a cap assembly for sealing the case, and a positive terminal and a negative terminal that are set up in the cap assembly and coupled with the electrode assembly. In addition, lead elements are coupled with the electrode assembly and the positive terminal and negative terminal, wherein the positive electrode and negative electrode include an uncoated region which is not coated with a positive active material or negative active material, respectively. The lead elements are coupled with more than half of the perimeter of the uncoated regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

The rechargeable battery of the present invention may be used as a high-power energy source for driving a motor which is used for hybrid electric vehicles (HEV), electric vehicles (EV), wireless appliances, motorbikes, and motor scooters which require high power performance. To achieve this, numerous rechargeable batteries are connected in series to form a battery module. In order to provide sufficient power, each rechargeable battery must have excellent current collecting efficiency.

The current collecting efficiency of the rechargeable battery of the present invention may be maximized by placing the lead elements over more than a half of the periphery of the uncoated regions and thereby widening the contact area between the lead elements and the uncoated regions to reduce contact resistance.

Figure 1:
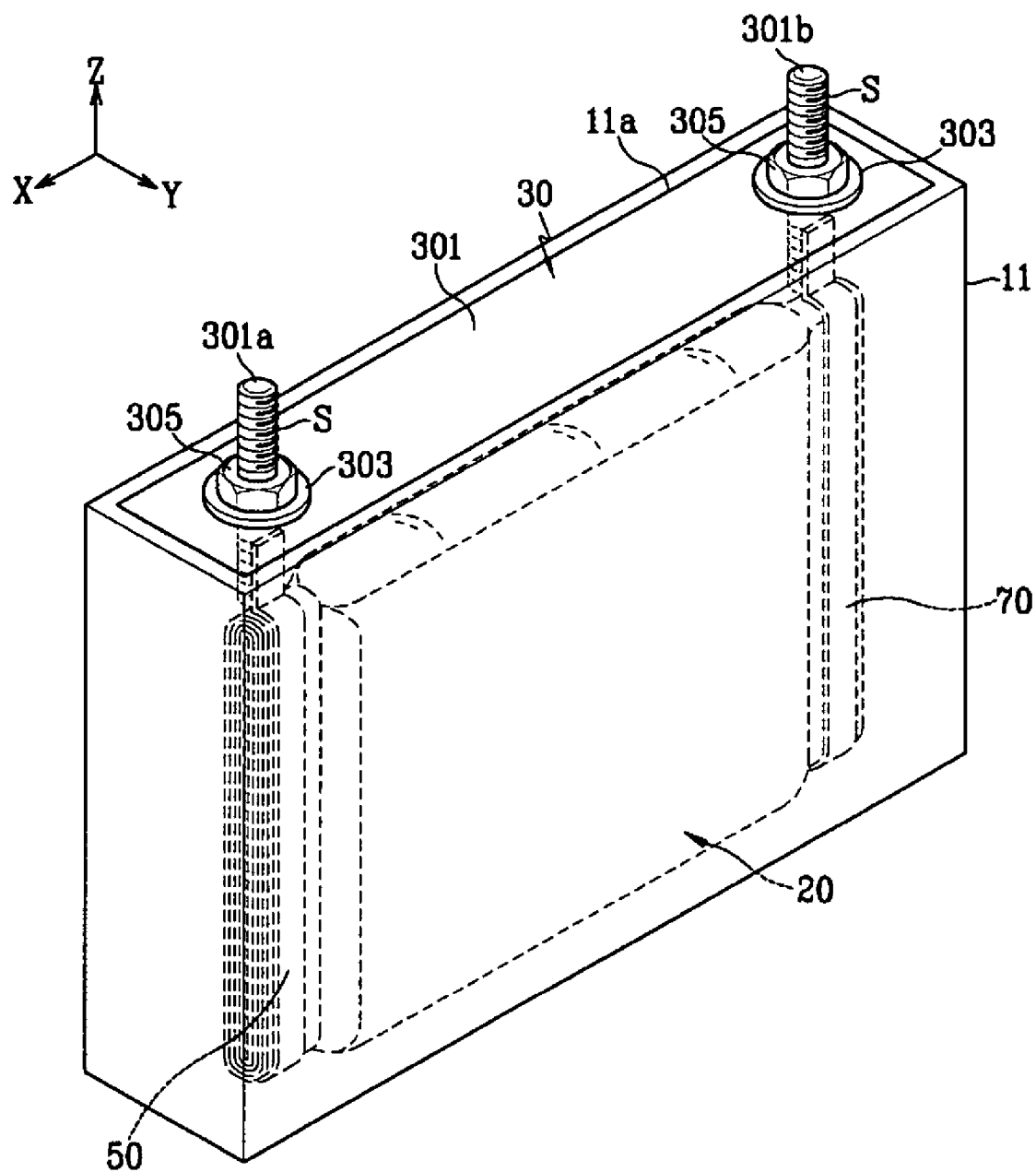
FIG. 1 is a perspective view of a rechargeable battery in accordance with an exemplary embodiment of the present invention.
Figure 2:
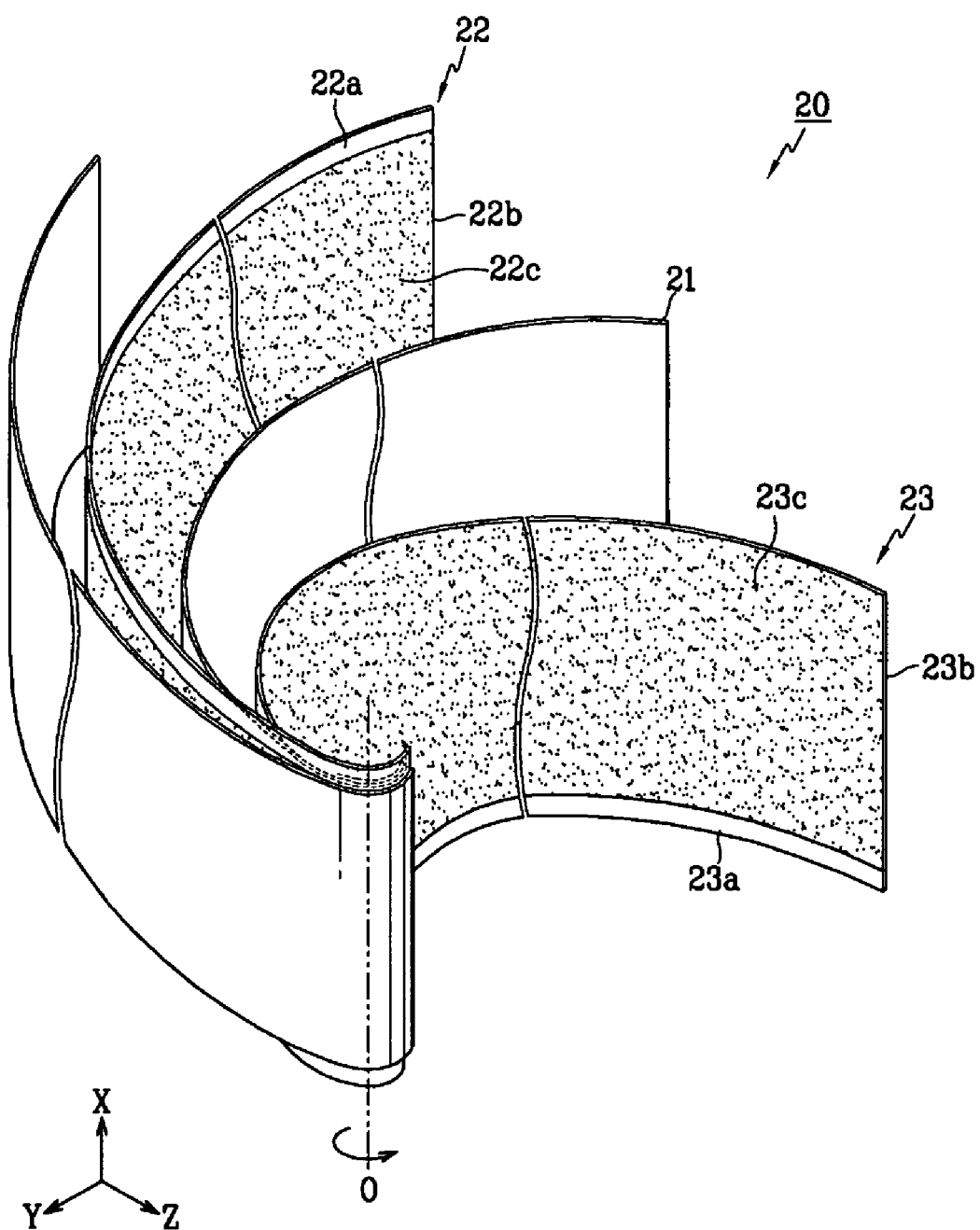
FIG. 2 is an exploded perspective view of an electrode assembly in accordance with the exemplary embodiment of the present invention.
Figure 3:
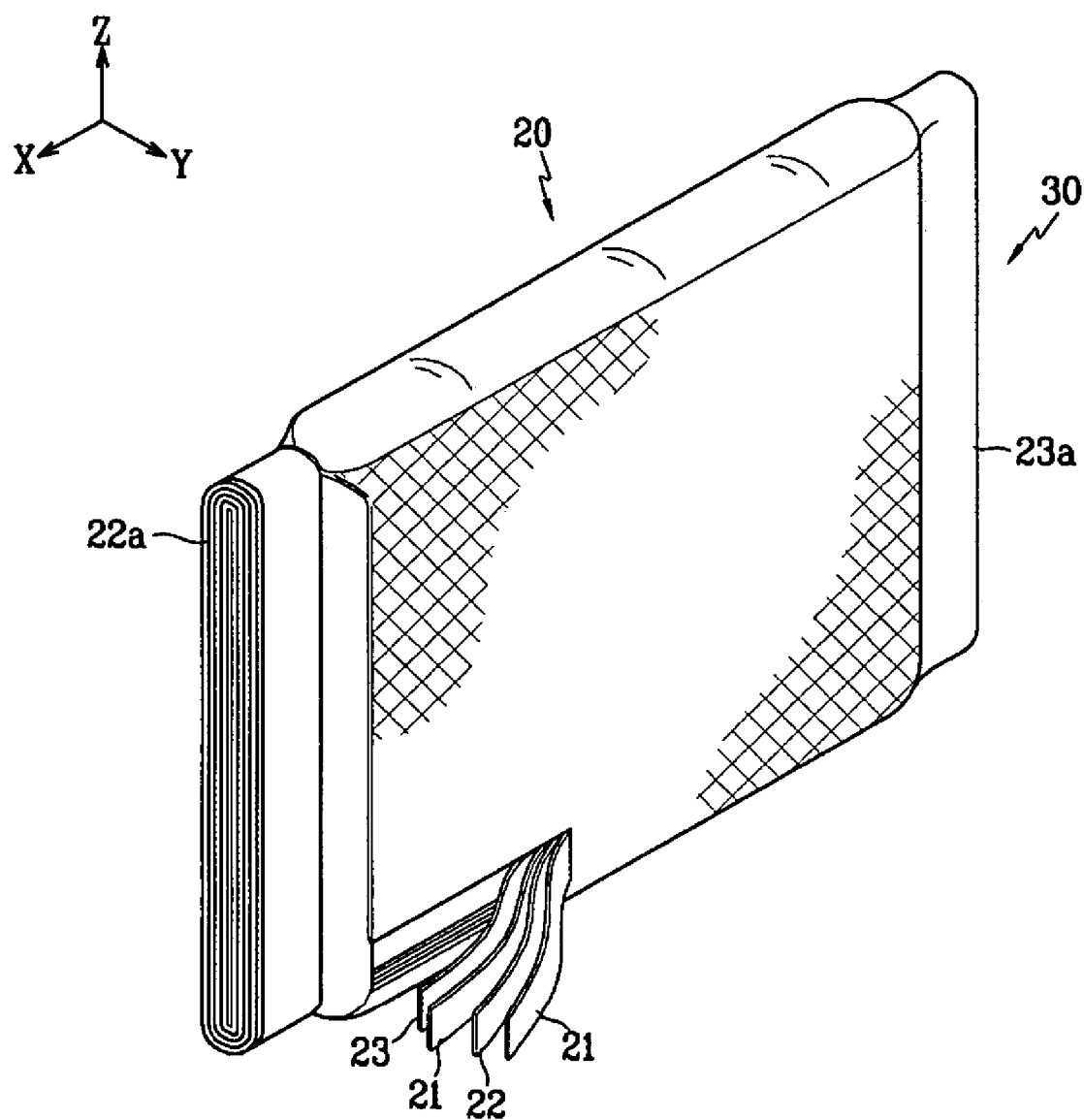
FIG. 3 is a perspective view of the electrode assembly in accordance with the exemplary embodiment of the present invention.

FIG. 1 is a perspective view of a rechargeable battery in accordance with an exemplary embodiment of the present invention. FIG. 2 is an exploded perspective view of an electrode assembly in accordance with the exemplary embodiment of the present invention. The rechargeable battery described in the present invention will be described hereafter with reference to these drawings.

The rechargeable battery of the present exemplary embodiment is formed by inserting an electrode assembly 20, which includes a positive electrode 22, a negative electrode 23 and an insulating separator 21 that is interposed between the positive electrode 22 and the negative electrode 23, into a hexahedral-shaped case 11 that has an open part, and sealing the open part of the case 11 with a cap assembly 30.

The case 11 may be formed of a conductive metal including, but not limited to aluminum, an aluminum alloy and nickel-plated steel. It may have a hexahedral shape that has an opening 11a through which the electrode assembly 20 can be inserted to be housed, but the present invention is not limited to this shape.

The electrode assembly 20 is formed by interposing the separator 21 between the positive electrode 22 and the negative electrode 23 and winding them together as a jelly-roll along a winding axis (O). After the electrode assembly 20 is wound into jelly-roll form, it is pressed and formed into a plate. The plate may have a rectangular shape, for example.

In both ends of the electrode assembly 20, an uncoated region 22a of a positive electrode and an uncoated region 23a of negative electrode are placed facing each other. Since the electrode assembly 20 has a jelly-roll form, the uncoated region 22a of the positive electrode and the uncoated region 23a of the negative electrode also form multiple layers.

The wound uncoated regions 22a and 23a contact each other tightly to improve the current collecting efficiency. The uncoated regions 22a and 23a are thinner than the other parts of the electrode assembly 20.

The uncoated regions 22a and 23a are not coated with corresponding active materials 22c and 23c along an edge of a side of a negative current collector 22b and a positive current collector 23b. The uncoated regions 22a and 23a collect current that is generated in the electrode assembly 20 and are coupled with lead elements 50 and 70.

The electrode assembly 20 and the lead elements 50 and 70 may be positioned such that the uncoated regions 22a and 23a fit in the ends of the case 11.

The cap assembly 30 includes a base plate 301 which seals the opening 11a of the case 11. The base plate 301 is provided with a positive terminal 301a and a negative terminal 301b part of which protrude to the outside of the battery. The positive terminal 301a and the negative terminal 301b are coupled with the lead elements 50 and 70, respectively.

The positive terminal 301a and the negative terminal 301b are provided with a screw thread (S) to fix them to the base plate 301 using bolts 305 and gaskets 303 that are interposed between the terminals 301a and 301b and the base plate 301.

In addition, an electrolyte inlet and a ventilator (not shown in the drawings) may be formed in the base plate 301.

Hereinafter, the electrode assembly 20 described in the present exemplary embodiment and the lead elements that are connected thereto will be described more in detail with respect to the current collecting efficiency. A structure that combines the electrode assembly 20 and the lead elements 50 and 70 will be described with reference to FIG. 4, FIG. 5, and FIG. 6.

Figure 4:
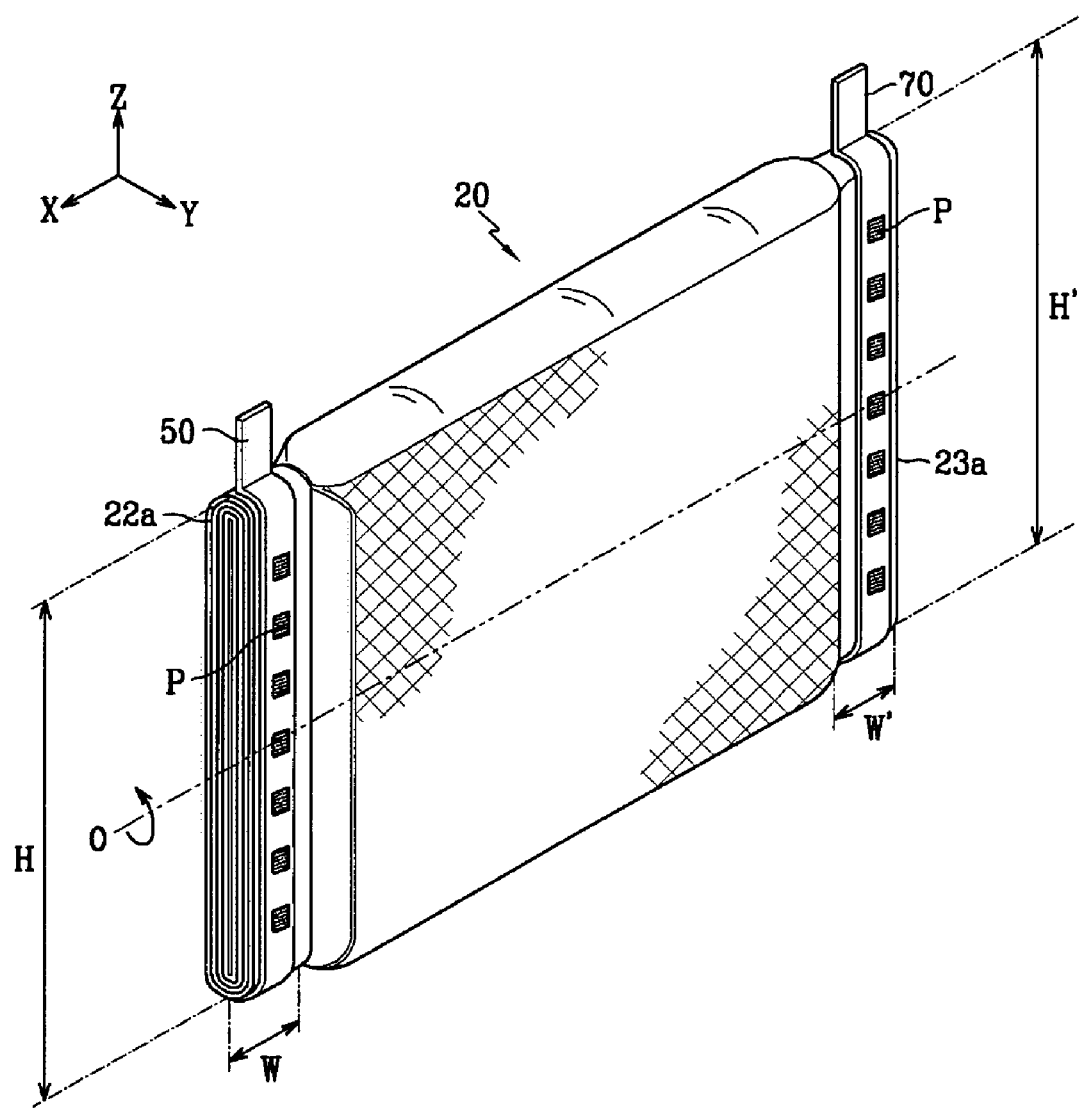
FIG. 4 is a perspective view of the electrode assembly combined with lead elements in accordance with the exemplary embodiment of the present invention.

The uncoated regions 22a and 23a to be connected to the lead elements 50 and 70 are positioned in a Z-direction as shown in FIG. 4, and they have a rectangular shape with a height (H,H') that is longer than a width (W,W').

The lead elements 50 and 70 may contact at least half of the periphery of the uncoated regions 22a and 23a. In other words, in the present embodiment, the lead elements 50 and 70 may entirely cover one of the two peripheral sides of the uncoated regions 22a and 23a.

Referring to FIG. 1, the line ends of the lead elements 50 and 70 may be coupled with the positive terminal 301a and the negative terminal 301b by contacting a part of the positive terminal 301a and a part of the negative terminal 301b that is inside the case 11.

The lead elements 50 and 70 may be coupled with the uncoated regions 22a and 23a by welding. As shown in FIG. 4, the connection is achieved by placing the lead elements 50 and 70 on the uncoated regions 22a and 23a and carrying out a resistant welding or an ultrasonic welding at welding points (P) that are set up on the lead elements 50 and 70 over the uncoated regions 22a and 23a. The number of welding points (P) is determined according to the area of the uncoated regions 22a and 23a to ensure that the lead elements 50 and 70 are coupled to the uncoated regions 22a and 23a.

Figure 5:
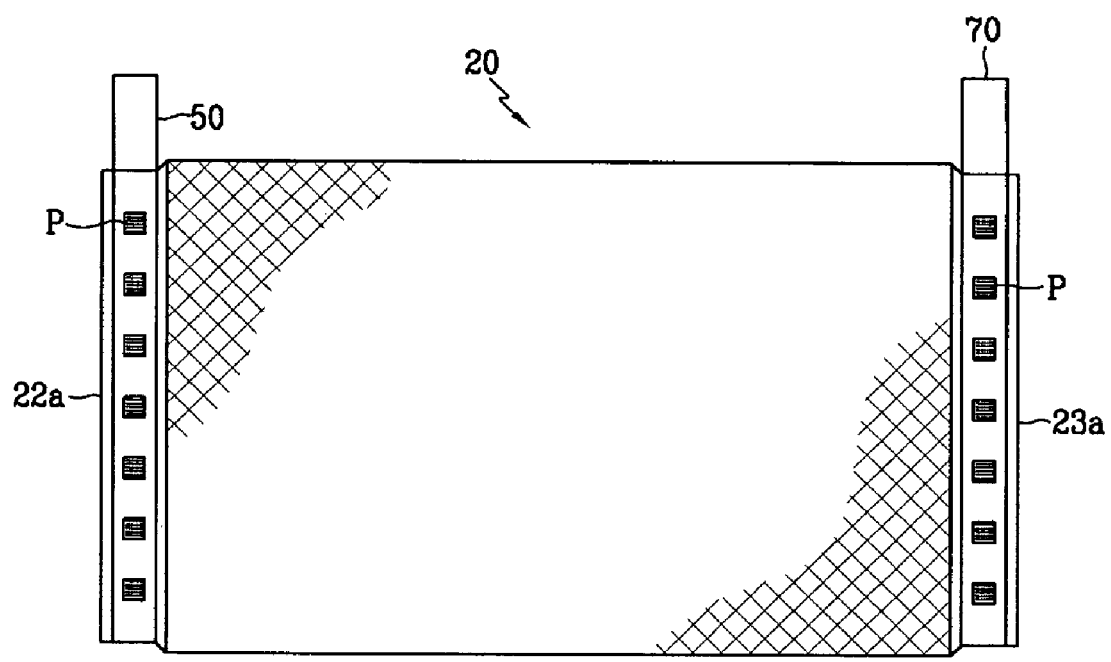
FIG. 5 is a front view of the electrode assembly combined with the lead elements in accordance with the exemplary embodiment of the present invention.
Figure 6:
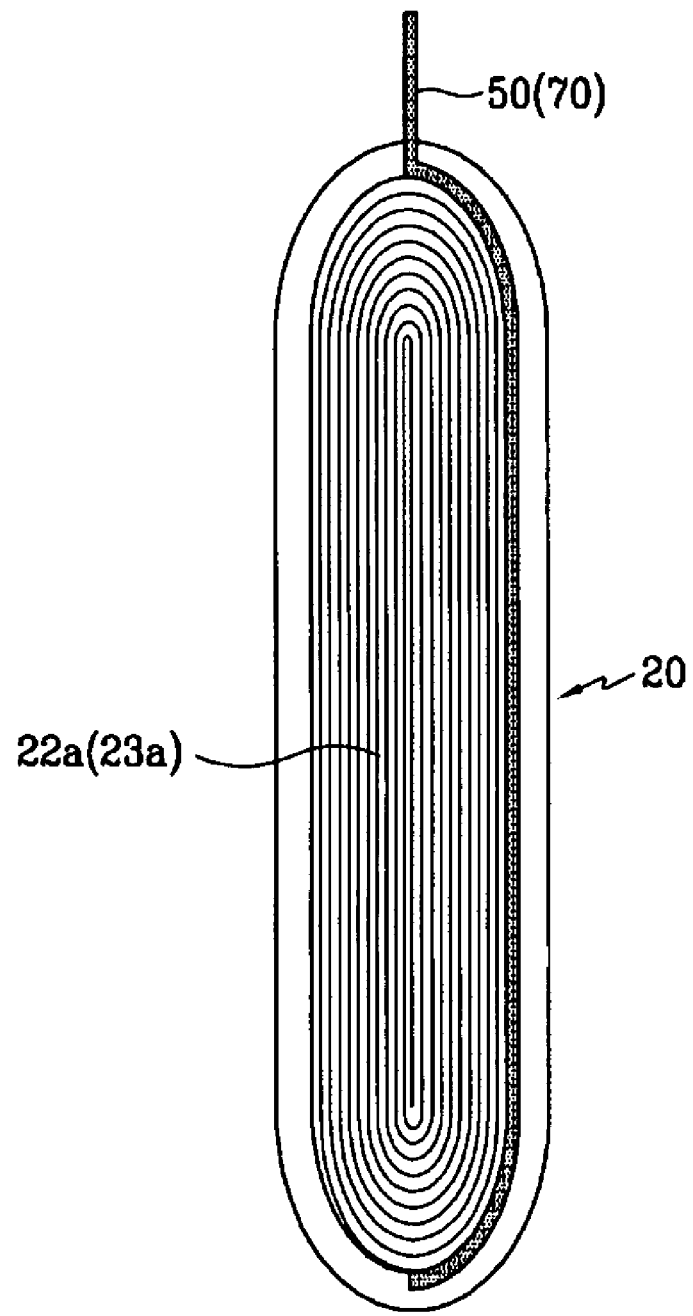
FIG. 6 is a side view of the electrode assembly that is combined with the lead elements in accordance with the exemplary embodiment of the present invention.

The front view and side view of the electrode assembly 20 are shown in FIG. 5 and FIG. 6, respectively.

When the lead elements 50 and 70 are coupled with the uncoated regions 22a and 23a of the positive and negative electrodes, respectively, the contact area between the lead elements 50 and 70 and the uncoated regions 22a and 23a becomes wider. Thus, it is possible to prevent the current collecting efficiency from dropping due to contact resistance.

Also, since the rechargeable battery of the present exemplary embodiment collects current from the entire uncoated regions 22a and 23a, it can collect the current more evenly than a conventional rechargeable battery which collects current by placing tabs on part of a current collector. In addition, the rechargeable battery of the present embodiment requires coupling only one lead element to an uncoated region which simplifies the manufacturing process, compared with a conventional rechargeable battery that collects current by coupling a plurality of tabs onto a current collector.

Figure 7A:
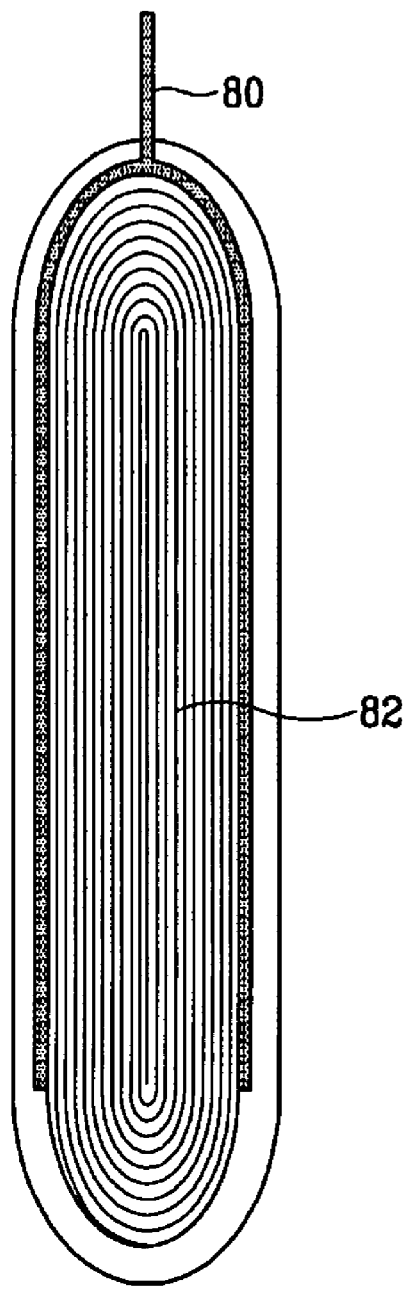
FIG. 7A, FIG. 7B, and FIG. 7C are side views of lead elements that are coupled with the uncoated regions of the electrode assembly in accordance with other exemplary embodiments of the present invention.
Figure 7B:
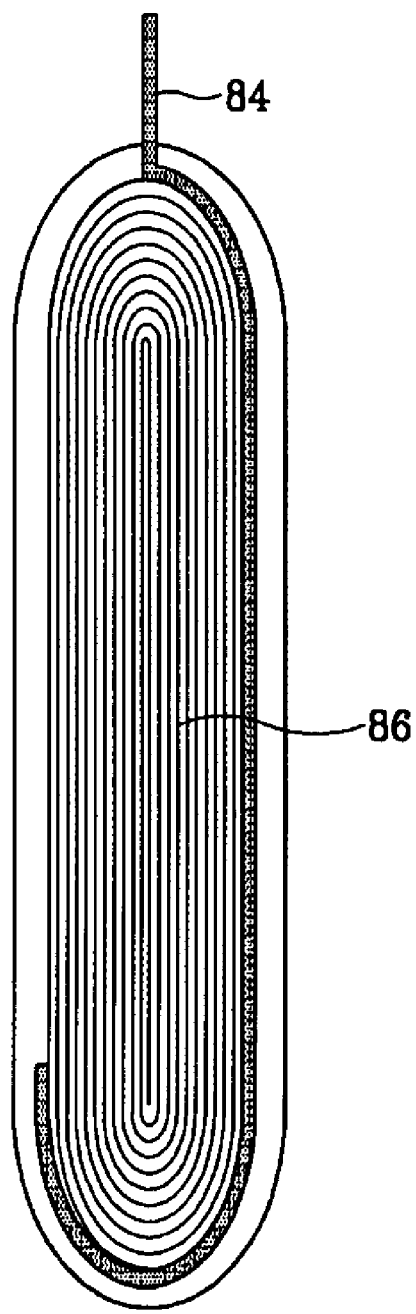
Figure 7C:
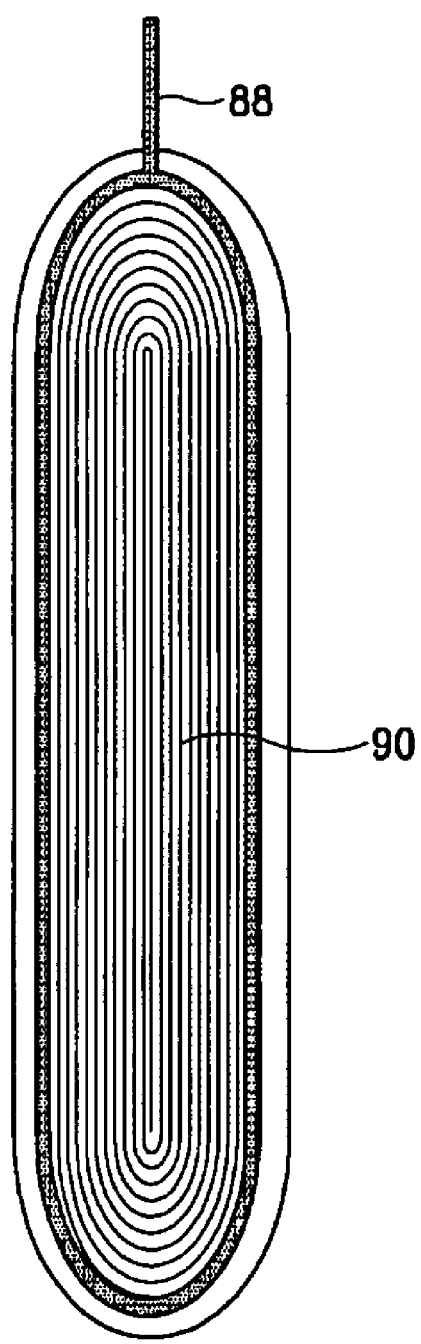

FIG. 7A, FIG. 7B, and FIG. 7C are side views of lead elements that are coupled with the uncoated regions of the electrode assembly in accordance with other exemplary embodiments of the present invention.

A lead element 80 shown in FIG. 7A is coupled with an uncoated region 82 by contacting both sides of the uncoated region 82 tightly. A lead element 84 shown in FIG. 7B is coupled with an uncoated region 86 by covering and tightly contacting one side of the uncoated region 86 entirely and part of the other side. A lead element 88 of FIG. 7C is coupled with an uncoated region 90 by covering and tightly contacting the entire uncoated region 90.

The lead elements 80, 84, and 88 and the uncoated regions 82, 86, and 90 may be applied to both the positive electrode and the negative electrode.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
    an electrode assembly comprising a positive electrode, a negative electrode, and a separator interposed between the positive electrode and the negative electrode;
    a case to house the electrode assembly;
    a cap assembly to seal the case;
    a positive terminal and a negative terminal positioned in the cap assembly and coupled with the electrode assembly;
    a first lead element coupled with the electrode assembly and the positive terminal; and
    a second lead element coupled with the electrode assembly and the negative terminal,
    wherein the positive electrode and negative electrode comprise an uncoated region that is not laminated and not coated with positive active material and negative active material, respectively, and
    wherein the first lead element comprises a first portion extending from the positive terminal to a first point on the electrode assembly, and a second portion extending around at least half of a circumference of the electrode assembly, the entire second portion of the first lead element directly contacting the uncoated region of the positive electrode on the at least half of the circumference, the second portion of the first lead element having a first plurality of welding points to weld the second portion of the first lead element to the uncoated region of the positive electrode, the first plurality of welding points being spaced apart from one another, a number of the first plurality of welding points being determined by an area of the uncoated region of the positive electrode, and
    wherein the second lead element comprises a first portion extending from the negative terminal to a first point on the electrode assembly, and a second portion extending around at least half of the circumference of the electrode assembly, the entire second portion of the second lead element directly contacting the uncoated region of the negative electrode on the at least half of the circumference, the second portion of the second lead element having a second plurality of welding points to weld the second portion of the second lead element to the uncoated region of the negative electrode, the second plurality of welding points being spaced apart from one another, a number of the second plurality of welding points being determined by an area of the uncoated region of the negative electrode.

2. The rechargeable battery of claim 1,
wherein the uncoated regions of the positive electrode and negative electrode form multiple layers by facing each other.

3. The rechargeable battery of claim 2,
wherein the electrode assembly is formed as a jelly-roll by winding the positive electrode, the negative electrode, and the separator.

4. The rechargeable battery of claim 3,
wherein the electrode assembly is formed as a plate by winding and pressing the positive electrode, the negative electrode, and the separator.

5. The rechargeable battery of claim 4,
wherein the second portion extends from the first portion in a clockwise direction around the circumference of the electrode assembly, and a third portion extending from the first portion in a counterclockwise direction around the circumference of the electrode assembly.

6. The rechargeable battery of claim 4,
wherein the second portion extends from the first portion around the circumference to a second point on the electrode assembly, the second point being opposite the first point.

7. The rechargeable battery of claim 1,
wherein the first and second lead elements are fixed onto the uncoated regions at the first and second plurality of welding points.

8. The rechargeable battery of claim 1,
wherein the rechargeable battery comprises a rectangular-box shaped battery.

9. The rechargeable battery of claim 1,
wherein the rechargeable battery is used for driving a motor.

* * * * *